US011006091B2

(12) United States Patent
Liu et al.

(10) Patent No.: US 11,006,091 B2
(45) Date of Patent: May 11, 2021

(54) OPPORTUNISTIC VOLUMETRIC VIDEO EDITING

(71) Applicant: AT&T Intellectual Property I, L.P., Atlanta, GA (US)

(72) Inventors: Zhu Liu, Marlboro, NJ (US); Eric Zavesky, Austin, TX (US); David Crawford Gibbon, Lincroft, NJ (US); Behzad Shahraray, Holmdel, NJ (US); Tan Xu, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/201,562

(22) Filed: Nov. 27, 2018

(65) Prior Publication Data
US 2020/0169715 A1 May 28, 2020

(51) Int. Cl.
*H04N 13/122* (2018.01)
*H04N 13/117* (2018.01)
*H04N 13/383* (2018.01)
*H04N 13/388* (2018.01)

(52) U.S. Cl.
CPC ......... *H04N 13/122* (2018.05); *H04N 13/117* (2018.05); *H04N 13/383* (2018.05); *H04N 13/388* (2018.05)

(58) Field of Classification Search
CPC .. H04N 13/122; H04N 13/117; H04N 13/383; H04N 13/388
See application file for complete search history.

(56) References Cited

U.S. PATENT DOCUMENTS

| 7,739,623 | B2 | 6/2010 | Liang et al. |
| 7,894,663 | B2 | 2/2011 | Berg et al. |
| 8,295,683 | B2 | 10/2012 | Widdowson |
| 8,500,284 | B2 | 8/2013 | Rotschild et al. |
| 8,743,109 | B2 | 6/2014 | Blank et al. |
| 8,787,658 | B2 | 7/2014 | Rother et al. |
| 8,964,008 | B2 | 2/2015 | Bathiche |
| 9,390,546 | B2 | 7/2016 | Buckton et al. |
| 9,489,764 | B2 | 11/2016 | Lee et al. |

(Continued)

FOREIGN PATENT DOCUMENTS

| KR | 20020073841 A | 3/2004 |
| WO | 2006067714 A2 | 6/2006 |

(Continued)

OTHER PUBLICATIONS

Barakonyi, Istvan, et al. "Collaborative work with volumetric data using augmented reality." Mixed and Augmented Reality, 2003. Proceedings. The Second IEEE and ACM International Symposium, IEEE, 2003. http://citeseerx.ist.psu.edu/viewdoc/download?doi=10.1.1.132.6205&rep=rep1&type=pdf.

(Continued)

*Primary Examiner* — Oschta I Montoya (57) ABSTRACT

A processing system having at least one processor may detect a first object in a volumetric video that is a focus of a user viewing a presentation of the volumetric video, detect an obstruction of a view of the user of at least a portion of the first object in the volumetric video, and perform at least one manipulation of the presentation of the volumetric video to the user to mitigate the obstruction of the view.

20 Claims, 4 Drawing Sheets

(56) References Cited

U.S. PATENT DOCUMENTS

| | | | |
|---|---|---|---|
| 9,928,661 | B1 | 3/2018 | Kinstner et al. |
| 2007/0297560 | A1 | 12/2007 | Song et al. |
| 2008/0043015 | A1 | 2/2008 | Valdiserri et al. |
| 2014/0180097 | A1 | 6/2014 | Rothberg et al. |
| 2014/0364215 | A1 | 12/2014 | Mikhailov et al. |
| 2016/0070356 | A1 | 3/2016 | Aguirre et al. |
| 2017/0316606 | A1* | 11/2017 | Khalid .................. G06T 17/00 |
| 2018/0035134 | A1 | 2/2018 | Pang et al. |
| 2018/0091791 | A1* | 3/2018 | Jiang .................... B24B 23/026 |
| 2018/0108169 | A1 | 4/2018 | Miller |
| 2018/0122142 | A1* | 5/2018 | Egeler .................. G06T 19/006 |
| 2018/0220048 | A1 | 8/2018 | Tamir et al. |
| 2018/0286130 | A1 | 10/2018 | Lee et al. |
| 2019/0261027 | A1* | 8/2019 | Hawke .................. G06F 3/013 |

FOREIGN PATENT DOCUMENTS

| | | |
|---|---|---|
| WO | 2017180615 A1 | 10/2017 |
| WO | 2017189490 A1 | 11/2017 |

OTHER PUBLICATIONS

Eisert, Peter, Eckehard Steinbach, and Bernd Girod. "Multi-hypothesis, volumetric reconstruction of 3-D objects from multiple calibrated camera views." Acoustics, Speech, and Signal Processing, 1999 IEEE International Conference, vol. 6, IEEE, 1999. https://pdfs.semanticscholar.org/4853/5a1c1ec6fe19566328b7d28613adbbbd48e4.pdf.

Goldluecke, Bastian, and Marcus Magnor. "Real-time free-viewpoint video rendering from volumetric geometry." Visual communications and Image Processing 2003, vol. 5150, 2003. https://pdfs.semanticscholar.org/6a4f/681584f4e84dbd3ff53090fc0bbf14e3d28c.pdf.

Son, Jung-Young, et al. "Live 3D video in volumetric display." Stereoscopic Displays and Virtual Reality Systems IX. vol. 4660. International Society for Optics and Photonics, 2002. http://libgen.io/scimag/get.php?doi=10.1117/12.468030&downloadname=&key=9XOQNB7GBE5IYM5Y.

* cited by examiner

OPPORTUNISTIC VOLUMETRIC VIDEO EDITING

The present disclosure relates generally to visual communication sessions, and more particularly to methods, computer-readable media, and devices for manipulating a presentation of a volumetric video to mitigate an obstruction of a view.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and device for manipulating a presentation of a volumetric video to mitigate, e.g., remove, an obstruction of a view. For instance, in one example, a method may include a processing system having at least one processor detecting a first object in a volumetric video that is a focus of a user viewing a presentation of the volumetric video, detecting an obstruction of a view of the user of at least a portion of the first object in the volumetric video, and performing at least one manipulation of the presentation of the volumetric video to the user to mitigate the obstruction of the view.

In some instances, a user experiencing a volumetric video (VV) may not be able to see objects or scene components of importance. For instance, occlusions, movements of objects, colors, or sizing of objects within a scene may block an object or make an object difficult to distinguish. Examples of the present disclosure automatically identify objects and scene points from a volumetric video and interactively allow users to manipulate a viewing experience (e.g., a presentation of the volumetric video) in a number of ways. In one example, the result of this editing may also be rendered as a new volumetric video, or a 2D projection of a traversal of the volumetric video. Specifically, examples of the present disclosure include object manipulations (e.g., changes in color, transparency, rotation, etc.), time and kinematic alterations (e.g., modifying visual dynamics of an object and its path through the volumetric video), and viewpoint manipulations (e.g., identifying potential occlusions and modifying one or more viewpoints/perspectives for rendering to avoid the occlusion(s)). Examples of the present disclosure may also include identifying and offering a selection of one or more rendering paths with the highest expected visual quality. In one example, the present disclosure may also provide for interactive application of manipulations in a volumetric video with previews.

To illustrate, in one example, a presentation of a volumetric video may be manipulated to remove, make transparent, or move an object covering a particular aspect of a background. For instance, the object may be manipulated to maintain a user-specific content focus. Alternatively, or in addition, to maintain a user-specific content focus, a viewpoint/perspective of the presentation of the volumetric video may be altered so as to provide a clear, or clearer view of an object, without obstruction. In one example, the type(s) of manipulations of the presentation of the volumetric video may be selected in accordance with a user profile (e.g., user preferences). Alternatively, or in addition, the type(s) of manipulations of the presentation of the volumetric video may be selected in accordance with a device context. For instance, a device may not be capable of rotating an object or moving a perspective.

Examples of the present disclosure may be used for training and instructional video generation, such as for allowing objects to be detected and explored by a user for a fuller context, or to enable instructors to point out important objects without having to manually identify and isolate the objects within the visual content. In another example, the present disclosure may include a set of fixed available viewpoints (e.g., allowing users to select from a fixed set of five viewpoints/perspectives, six viewpoints/perspectives, etc.). In such an example, the present disclosure may further include identifying and verifying that objects of focus have no occlusions from all intended viewpoints. For instance, if the context is preparing a sports highlight reel, the present example may validate that no players of interest are blocked. Otherwise, the user may be enabled to modify positions of players and/or other objects to avoid occlusion.

An example of the operations of the present disclosure may proceed as follows. A user may experience a presentation of a volumetric video either as a two-dimensional (2D) projection of a view of the volumetric video (e.g., via a desktop computer, laptop computer, tablet computer, smartphone, etc.) or in a three-dimensional (3D) immersive environment (e.g., using a virtual reality (VR) headset or the like). In one example, a processing system may identify an object that is the focus of the user and provide suggestions (hinting) to the user for improved viewing locations, views, and/or perspectives within a space of the volumetric video. An object may be determined to be a focus of a user based upon a size and/or a location of the object with respect to a viewing perspective. Alternatively, or in addition, an object may be determined to be a focus based upon a user input via a pointer, a mouse, a voice command or other verbal or audio cues (e.g., expressions of surprise, interest, etc.), a visual highlighting, etc. In one example, detection of a user gaze (e.g., a multi-second gaze) based upon head orientation, eye gaze direction, and/or eye focus can select a specific object or region as being a focus. In one example, multiple users may be experiencing a volumetric video as a group, and a focus may be determined from the collective focuses of the users. In one example, viewing histories of others may be recorded and used to identify popular objects. In such an example, a subsequent user may be provided with suggestions (e.g., via highlighting, halos, blinking lights, etc.) of objects on which to focus, which the user may then select specifically via a definitive input, or implicitly, e.g., via head direction and/or eye gaze.

In one example, properties of the object of focus, properties of other object(s), or both may be tracked to detect when the object of focus may be occluded in a current perspective of a user. For a stored volumetric video, the processing system may look ahead to subsequent frames to identify a definitive occlusion. For streaming volumetric video, the processing system may detect a potential or likely occlusion based upon object trajectories. For instance, object trajectories may be calculated in accordance with object position information from a plurality of previous frames.

In one example, when an occlusion or potential occlusion (e.g., at least a partial blocking of the object of focus) is detected, the processing system may then implement one or more manipulations of the presentation of the volumetric video to mitigate the obstruction of the view. For instance, the processing system may automatically make an occluding object transparent/hidden to keep the object of focus in view, may shift a position of the occluding object, and so forth. In accordance with the present disclosure, some of the types of manipulations of the presentation of the volumetric video that may be implemented may include color/transparency modifications, such as hiding or making partially transparent an occluding object based on movement of the object of focus, the occluding object, or both within scene, adjusting lighting conditions if another object were to shade/shadow an object of focus, and so forth.

Other types of manipulations of the presentation of the volumetric video may include time shifts, such as slowing the movement of one or both of the objects, zooming in or out on the object of focus, shrinking the occluding object, changing a position of one or both of the objects, or changing a viewpoint/perspective of the user to avoid the occluding object (e.g., without the user having to specify the change in view by walking, adjusting a gaze, panning and zooming, providing a specific input to shift left, right, forward, backward, up, down, etc.). In still another example, an occlusion may be detected as an obstruction of at least a portion of an object of focus. For example, the processing system may detect an "object of focus" to be a detail that may be on one side of a larger object that is blocked within the current view by another side/portion of the larger object. In such an example, the manipulation may include rotating the larger object or the viewing perspective to make the details of focus visible to the user.

In one example, the processing system may refer to a user profile which may provide rules or preferences for certain types of manipulations in different contexts, e.g., for certain times of the day, days of the week, etc., for different topics or themes of the volumetric video, e.g., "sports," "work," "recreation," etc., for different devices being used to experience the volumetric video, and so forth. In another example, the processing system may propose or offer to the user for selection of one or more manipulations of the object of focus, the occluding object, or both. In one example, the processing system may log user selections, and save the selected modifications as rules for application in other views. In one example, the processing system may also provide "hot keys" for frequent actions based upon the user's past selections of one or more modification types. In another example, the processing system may provide a user-adjustable parameter to enable/disable, or to set an intermediate level of manipulation (e.g., 100% corresponds to full manipulation, 50% corresponds to manipulations in certain defined contexts which are designated as more important (such as driving scenarios, contested officiating calls in sporting events, etc.)). In still another example, modification rules may be associated with certain objects or object categories (e.g., rules for cars, rules for boats, or rules for "vehicles" more generally, rules for dogs, rules for cats, or rules for "animals" more generally, and so forth). The modification rules may be system-wide, or may be user-specific and/or learned over time from various user-selected manipulations.

In one example, the processing system may save edits/modifications by overwriting an existing volumetric video, or creating a new volumetric video or a new version number of the volumetric video. In one example, the processing system may save a 2D or 3D traversal of the volumetric video in accordance with the modification of the presentation of the volumetric video as described herein. For instance, the processing system may save a 2D projection of the volumetric video or select a subset of the volumetric video comprising the information to enable 3D playback in accordance with altered user viewpoint(s)/perspective(s), modified object positions, movements, etc.

Examples of the present disclosure may also include additional modifications to the presentation of a volumetric video. For example, non-essential objects (e.g., objects not in focus) may be omitted. Non-essential objects may also be substituted for an object model of a same object type as the object. For instance, actual imagery of a car may be replaced with a 3D object model of a car (e.g., not the specific car captured in the volumetric video). A volumetric video containing this alteration may then be stored, and may provide a storage volume reduction compared to the original version of the volumetric video. For example, detailed visual information of the car from the original volumetric video may be replaced with a placeholder/reference to a 3D object model from a library. In addition, multiple volumetric videos may reference the same 3D object model in the library and provide similar storage volume savings. In one example, a 3D object model may be enhanced with a texture mapping of visual features of the non-essential object. For instance, the coloring or other more distinctive features of the actual object may be projected onto the 3D object model to maintain some fidelity to the original content while still providing a measure of data storage efficiency. Examples of the present disclosure therefore improve viewing experiences by maintaining the importance of an object of focus and personalizing volumetric video consumption. Enhancement of 3D objects by using existing object library references also provides for storage volume reductions and network bandwidth savings for streaming applications. These and other aspects of the present disclosure are described in greater detail below in connection with the examples of FIGS. 1-4.

Figure 1:
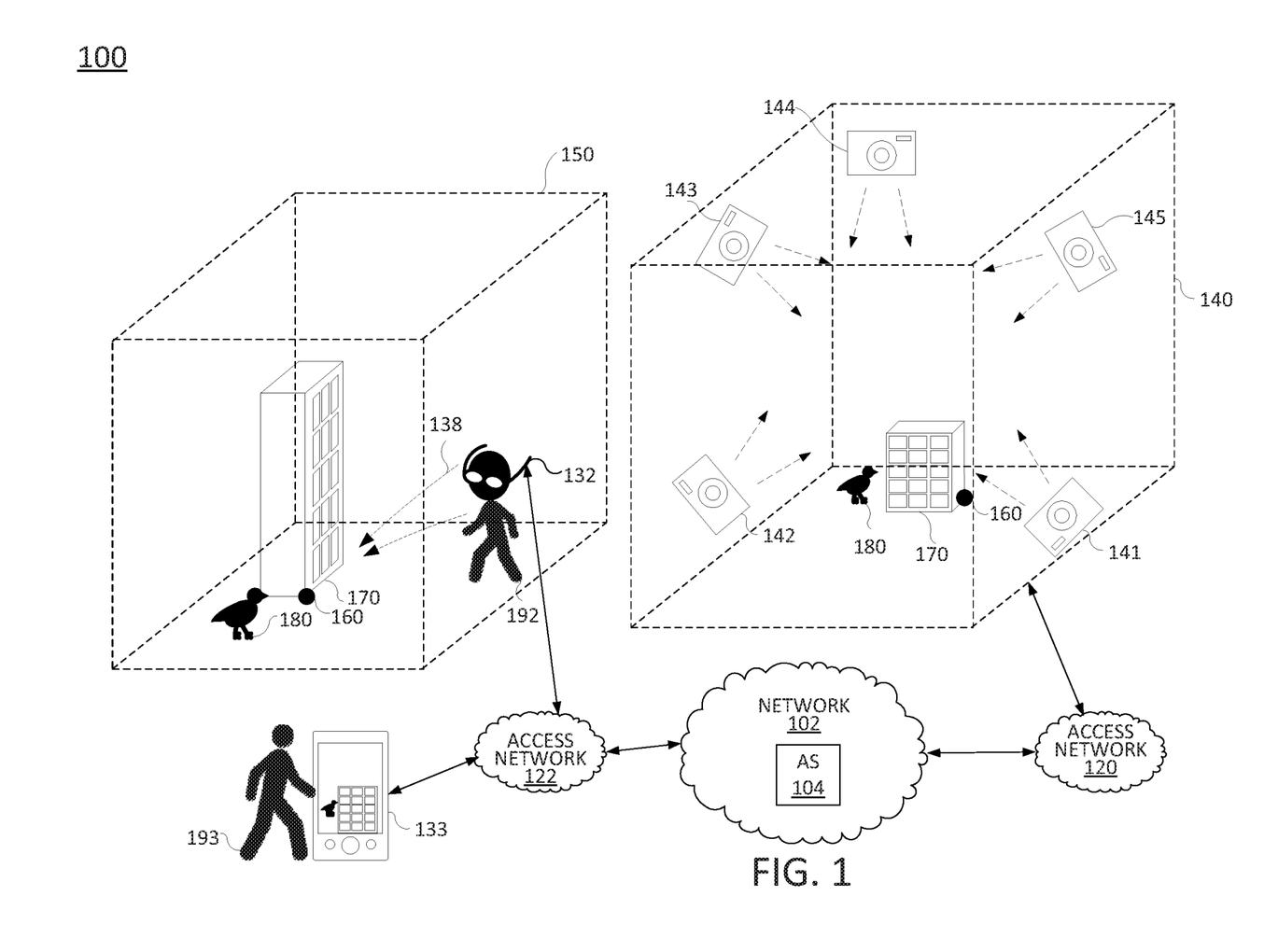
FIG. 1 illustrates an example network related to the present disclosure.

To further aid in understanding the present disclosure, FIG. 1 illustrates an example system 100 in which examples of the present disclosure for manipulating a presentation of a volumetric video to mitigate an obstruction of a view may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 4:
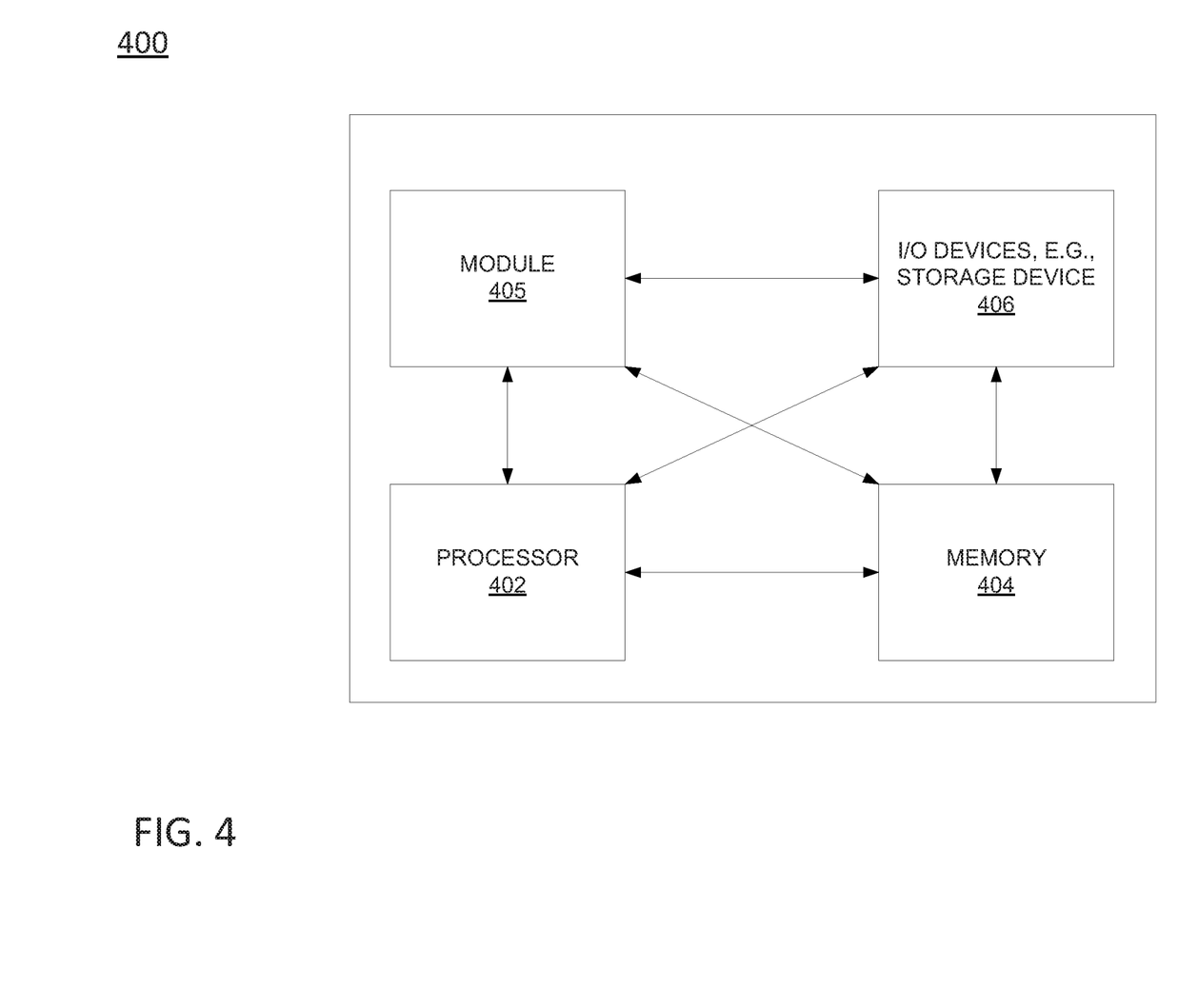
FIG. 4 illustrates a high level block diagram of a computing device specifically programmed to perform the steps, functions, blocks and/or operations described herein.

In accordance with the present disclosure, application server (AS) 104 may comprise a computing system or server, such as computing system 400 depicted in FIG. 4, and may be configured to provide one or more operations or functions for manipulating a presentation of a volumetric video to mitigate an obstruction of a view, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for manipulating a presentation of a volumetric video to mitigate an obstruction of a view, in accordance with the present disclosure. In one example, AS 104 may comprise a physical storage device (e.g., a database server), to store various types of information in support of systems for manipulating a presentation of a volumetric video to mitigate an obstruction of a view, in accordance with the present disclosure. For example, AS 104 may store a library of volumetric videos, a plurality of object detection/recognition models (e.g., machine learning-based image detection models), a catalog of 3D object models, user preferences for manipulations of presentations of volumetric videos when objects of focus are obstructed, and so forth. AS 104 may further store additional information such as a lexicon of topic models, e.g., machine learning-based models to identify topics and/or themes in 2D and/or volumetric video, and so forth. For ease of illustration, various additional elements of network 102 are omitted from FIG. 1.

As referred to herein, a machine learning model (MLM) (or machine learning-based model) may comprise a machine learning algorithm (MLA) that has been "trained" or configured in accordance with input data (e.g., training data) to perform a particular service, e.g., to detect a type of object in 2D and/or 3D images and/or video content. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

The types of features from which object detection/recognition models may be derived may include visual features from 2D images or video, 3D images or video, and/or volumetric video. For instance, the visual features may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a plurality of video capture devices, e.g., cameras 141-145. Similarly, access network 122 may be in communication with one or more devices, e.g., devices 132 and 133. Access networks 120 and 122 may transmit and receive communications between cameras 141-145, devices 132 and 133, and application server (AS) 104, other components of network 102, devices reachable via the Internet in general, and so forth. In one example, devices 132 and 133 may each comprise a mobile device, a cellular smart phone, a wearable computing device (e.g., smart glasses, a virtual reality (VR) headset, or the like), a laptop computer, a tablet computer, a desktop computer, or other types of personal computer, an application server, a bank or cluster of such devices, and the like. In one example, devices 132 and 133 may each comprise programs, logic or instructions for performing functions in connection with examples of the present disclosure for manipulating a presentation of a volumetric video to mitigate an obstruction of a view. For example, devices 132 and 133 may each comprise a computing system or device, such as computing system 400 depicted in FIG. 4, and may be configured to provide one or more operations or functions in connection with examples of the present disclosure for manipulating a presentation of a volumetric video to mitigate an obstruction of a view, as described herein.

In the present example, a volumetric video may be captured from a scene in a physical environment or a physical location 140. For instance, the cameras 141-145 may be deployed with different perspectives (e.g., different orientations and viewpoints) of the physical environment 140. In the present example, the cameras 141-145 may capture 2D videos of a building 170 and a bird 180. In one example, the volumetric video may be composited from the 2D videos obtained from the different cameras 141-145. For instance, the cameras 141-145 may feed the respective 2D videos to AS 104 in network 102 via access network 120. AS 104 may then compose the volumetric video using photogrammetric techniques. For instance, the visual scene at the physical environment 140 may be represented in the volumetric video as voxels having positional coordinates (e.g., X, Y, Z with respect to a reference point), color information (e.g., red, green, blue values and/or cyan, magenta, yellow values), transparency information (e.g., zero to 100 percent), shading information, texture information, and so forth. In one example, the set of information values for respective voxels may change from one frame of the volumetric video to the next as objects move through the physical environment 140, as lighting or other environmental conditions change, and so forth. Thus, AS 104 may calculate information values for each voxel and for each frame from the 2D videos sourced from the cameras 141-145.

For illustrative purposes, the physical environment 140 may include a reference point 160 which may be associated with the building 170. For instance, the building 170 may comprise a known landmark, and reference point 160 may denote a corner of the building 170. Alternatively, or in addition, wireless beacons (not shown) in physical environment 140 having known locations may be used as reference points, such as Institute of Electrical and Electronics Engineers (IEEE) 802.15 based-beacons, IEEE 802.11 wireless routers and/or access points (AP), cellular base stations (or more particularly, the base station antennas), etc. For instance, cameras 141-145 may determine their respective positions via observed time difference of arrival (OTDA), barycentric triangulation, or a similar technique with reference to one or more wireless beacons. In one example, cameras 141-145 may provide to AS 104 information from which the camera's perspective(s) may be quantified, such as: position information (e.g., GPS coordinates, coordinates and/or a position vector in relation to reference point 160, etc.), orientation information (e.g., azimuth and/or elevation information derived from a gyroscope and compass), and so forth. As such, AS 104 may generate the volumetric video as photogrammetric combinations of the 2D videos in accordance with the perspective information from cameras 141-145. It should be noted that the foregoing describes an example where the 2D video feeds of cameras 141-145 are temporally aligned. However, in other, further, and different examples, a volumetric video may be composited from 2D source videos capturing the same physical environment 140, but at different times. For instance, the building 170 may be substantially unchanged over several days from which different 2D source videos may be obtained.

As further illustrated in FIG. 1 a user 192 may be experiencing a presentation of the volumetric video within a space 150 of the volumetric video. For instance, the device 132 may comprise a wearable computing device (e.g., a VR headset) and may present a space 150 of a volumetric video for user 192. In one example, device 132 may communicate via access network 122 to request the volumetric video, to receive the volumetric video and/or to receive at least a portion of the volumetric video to be used in rendering a portion of the space 150 that is currently within the perspective/view of the user 192, to provide position and orientation information of a view of the user to AS 104 to determine which portion of the volumetric video to provide, to provide commands to start, stop, pause, resume, etc. (e.g., in an example where the volumetric video is streamed from AS 104), and so forth.

To illustrate, user 192 may set a perspective from which to experience the visual contents of the volumetric video. For instance, a user interface of device 132 may provide for the user 192 to move a viewpoint left/right, up/down, forward/backward, etc., to select coordinates or define a position with respect to a reference point (e.g., reference point 160), and so forth. In one example, the user 192 may change perspectives by changing a location, e.g., by walking, changing a focus, e.g., by moving the user's head and/or eyes, changing a zoom level via a specific command and/or via eye adjustment, and so on.

In accordance with the present disclosure, the focus 138 of the user 192 in connection with the presentation of the volumetric video may be determined to be the bird 180. For instance, device 132 or AS 104 may determine that the user 192 has a persistent gaze in the direction of the bird 180. Alternatively, or in addition, device 132 or AS 104 may detect a voice command from the user (e.g., "focus on bird"), or other commands or signals via a different input modality, such as detecting an eye gaze of the user, a head movement of the user, a verbalization of the user (e.g., not a command, but perhaps an expression of surprise, interest, etc.), a gesture input of the user, or an input of the user via a tactile interface.

Continuing with the present example, device 132 or AS 104 may then detect an obstruction of a view of the user 192 to at least a portion of the bird by one or more other objects in the volumetric video, such as building 170. The obstruction of the view may be an actual current obstruction or a potential or likely obstruction detected based upon trajectories of the bird 180 and/or trajectories of the one or more other objects. Notably, in the present example, the "other" object is building 170, which is static and does not have a trajectory. However, different examples may include mobile objects, such as cars, trains, boats, animals, people, etc., which may result in the obstruction of a view of an object of focus.

Figure 2:
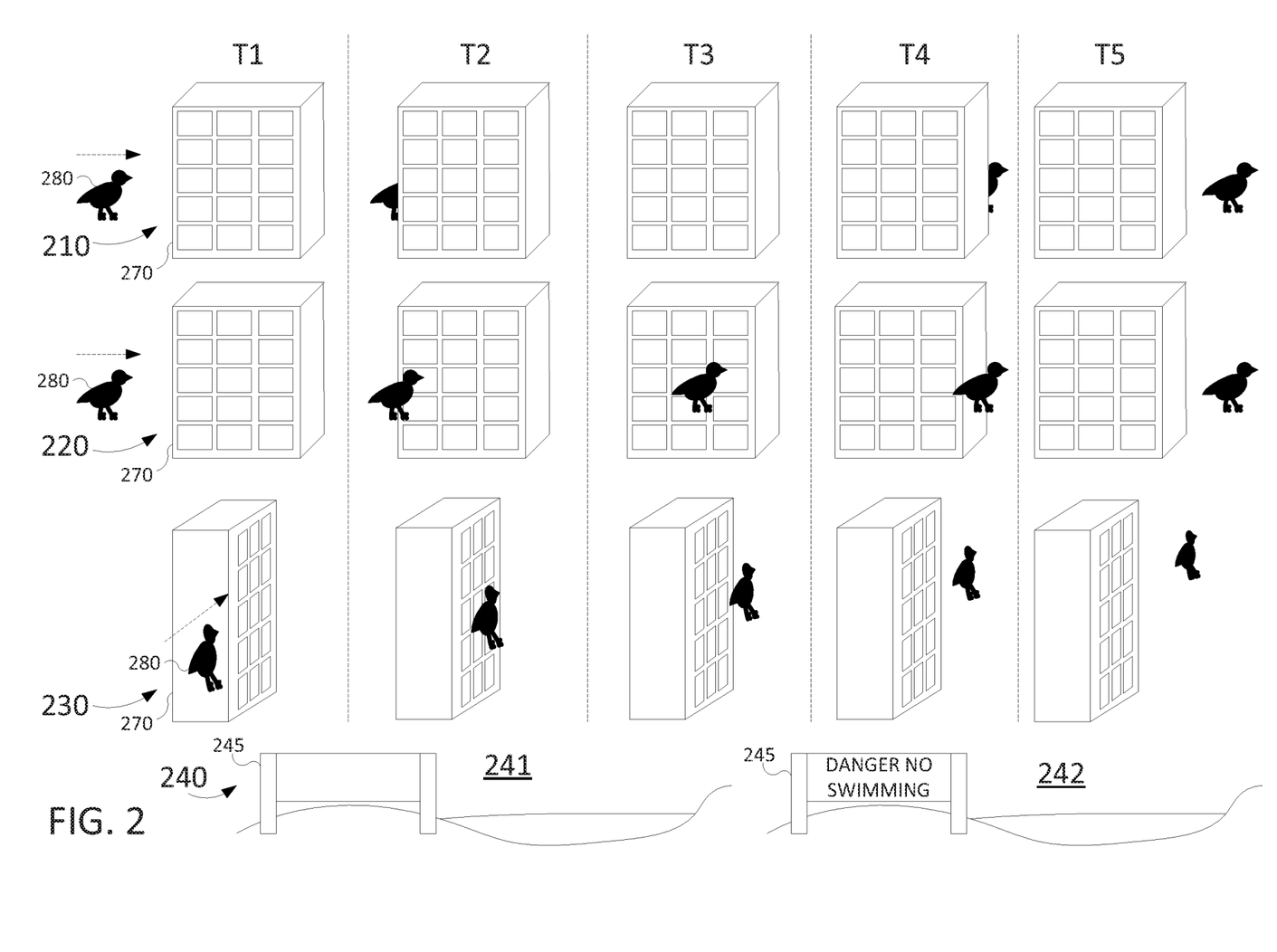
FIG. 2 illustrates example manipulations to a presentation of a volumetric video to mitigate an obstruction of a view, in accordance with the present disclosure.

In accordance with the present disclosure, in response to detecting an obstruction of a user view of an object of focus, one or more manipulations of the presentation of the volumetric video may be performed, as described herein. It should be noted that either or both of AS 104 or device 132 may perform such manipulations depending upon the particular system configuration. For instance, in a streaming service model of volumetric video consumption, AS 104 may detect the obstruction and make the modifications to the data stream being sent to device 132 in connection with the presentation of the volumetric video to user 192. In a local service model, device 132 may obtain the volumetric video (e.g., in whole or in part, and/or via a stream from AS 104) and may implement the modifications to the presentation of the volumetric video for rendering via the display components of the device 132. Alternatively, or in addition, device 132 may be paired with another local computing device (not shown), such as a personal computer of user 192, for performing the operations or functions for manipulating a presentation of a volumetric video to mitigate, e.g., remove, an obstruction of a view, as described herein. For instance, such a device may obtain the volumetric video from AS 104, perform various operations for manipulating a presentation of a volumetric video to mitigate an obstruction of a view, as described herein, and provide an output stream comprising the presentation of the volumetric video to user 192 via device 132. Examples of some of the types of manipulations that may be made to the volumetric video to mitigate an obstruction of a view are illustrated in FIG. 2.

It should also be noted that whether to implement one or more manipulations, the types of manipulations to implement, and so forth may be determined based upon different rules or user preferences for certain types of manipulations in different contexts. Thus, for instance, a context may be determined based upon time of day, day of week, etc., based upon a location of the physical environment 140 from which the volumetric video is captured, based upon device capabilities, based upon whether the presentation of the volumetric video is a group experience or an individual experience, based upon the presence of certain objects (e.g., detected in accordance with one or more object detection/recognition models), based upon the presence of certain themes in the volumetric video (e.g., detected in accordance with one or more topic models), and so forth. In another example, the device 132 and/or AS 104 may propose or offer to the user for selection one or more manipulations of the object of focus (e.g., bird 180), an occluding object (e.g., building 170), or both.

As further illustrated in FIG. 1, another user 193 may also obtain and experience the volumetric video via the device 133. For instance, device 133 may comprise a mobile computing device, such as a smartphone, a tablet, or the like with a 2D display screen. In one example, AS 104 may provide a 2D output video comprising a 2D projection of the volumetric video from one or more viewing perspectives to device 133. Alternatively, or in addition, AS 104 may provide the volumetric video to device 133, and device 133 may render the volumetric video in accordance with the 2D display capabilities of the device 133. For example, the user 193 may select one or more perspectives from within the space 150 of the volumetric video from which to render the 2D output video. In addition, in such case, device 133 and/or AS 104 may similarly detect an object of focus (e.g., bird 180), detect an obstruction of a user view of at least a portion of the object of focus (e.g., a blocking of bird 180 by building 170), and perform one or more manipulations of the presentation of the volumetric video in response to the detection of the obstruction, as described herein.

As stated above, the presentation of the volumetric video may be modified, or manipulated, in response to detecting an obstruction of an object of focus. However, depending upon the type(s) of manipulation(s), AS 104 may also store a volumetric video modified in accordance with the manipulation, e.g., as a new volumetric video, as a replacement to the volumetric video, as a new version of the volumetric video, etc. or may store a 2D video corresponding to the presentation of the volumetric video that is modified. For instance, user 192 may wish to save a 2D video of the perspective(s) of user 192 in accordance with the presentation of the volumetric video that is manipulated. In addition, user 192 may wish to share this 2D video with user 193 and may direct user 193 to obtain such a 2D video from AS 104 for presentation at device 133.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within physical environment 140. Thus, these and other modifications are all contemplated within the scope of the present disclosure.

To further aid in understanding the present disclosure FIG. 2 illustrates example manipulations to a presentation of a volumetric video to mitigate an obstruction of a view, in accordance with the present disclosure. In particular, FIG. 2 illustrates a volumetric video 210, represented at several times T1-T5. The times T1-T5 may represent sequential frames. However, for illustrative purposes, T1-T5 may represent successive frames sampled at a rate less than a frame rate of the volumetric video 210. In the present example, the volumetric video 210 may include imagery of two objects, a building 270 and a bird 280, which may correspond to the building 170 and bird 180 of FIG. 1. Similar to the example discussed above in connection with FIG. 1, a processing system (such as AS 104, device 132, or both in FIG. 1), may determine that bird 280 is an object of focus of a user in connection with a presentation of the volumetric video 210. If the volumetric video 210 were to continue to be presented to the user in an original format, it may be determined that building 270 will obstruct the view of the user to the object of focus, bird 280. This is illustrated for times T2, T3, and T4 for volumetric video 210. However, in accordance with the present disclosure, the processing system may manipulate the presentation of the volumetric video to mitigate the obstruction of the view.

As a first example, a first modified presentation 220 of the volumetric video 210 is shown in FIG. 2. In the first modified presentation 220, the occluding object, building 270, may be made fully or partially transparent to allow the user to experience a view to the bird 280 over all of the times T1-T5. As another example, a second modified presentation 230 of the volumetric video 210 is also shown in FIG. 2. In the second modified presentation 230, the user view is manipulated such that the viewing perspective of the user is on another side of the building 270. As such, the bird 280 remains visible from the user perspective over all of the times T1-T5.

A third example, relates to an additional volumetric video 240. A first user perspective 241 at a given time is as illustrated. The first user perspective 241 may include a view of a sign 245 looking out over a body of water. The sign 245 may be determined to be an object of focus. However, the sign may include important information that is not visible to the user from the current perspective. In such an example, the presentation of the volumetric video 240 may be modified to rotate the object of focus, sign 245. The modified presentation 242 shows that the other side of the sign 245 has been made visible, allowing the user to see the important warning: "danger: no swimming." Additional manipulations of volumetric video 210 and/or volumetric video 240 may also be implemented as alternatives to, or in addition to the specific examples in FIG. 2. For instance, a user perspective may be modified to zoom in on the object of focus. In such case, an obstruction of the user view may be minimized, e.g., if the occluding object is smaller than the object of focus and/or would only result in a partial obstruction/occlusion. In another example, the object of focus or obstructing/occluding object may be shifted in position to mitigate the obstruction. Thus, these and other examples may all be provided in accordance with the present disclosure.

Figure 3:
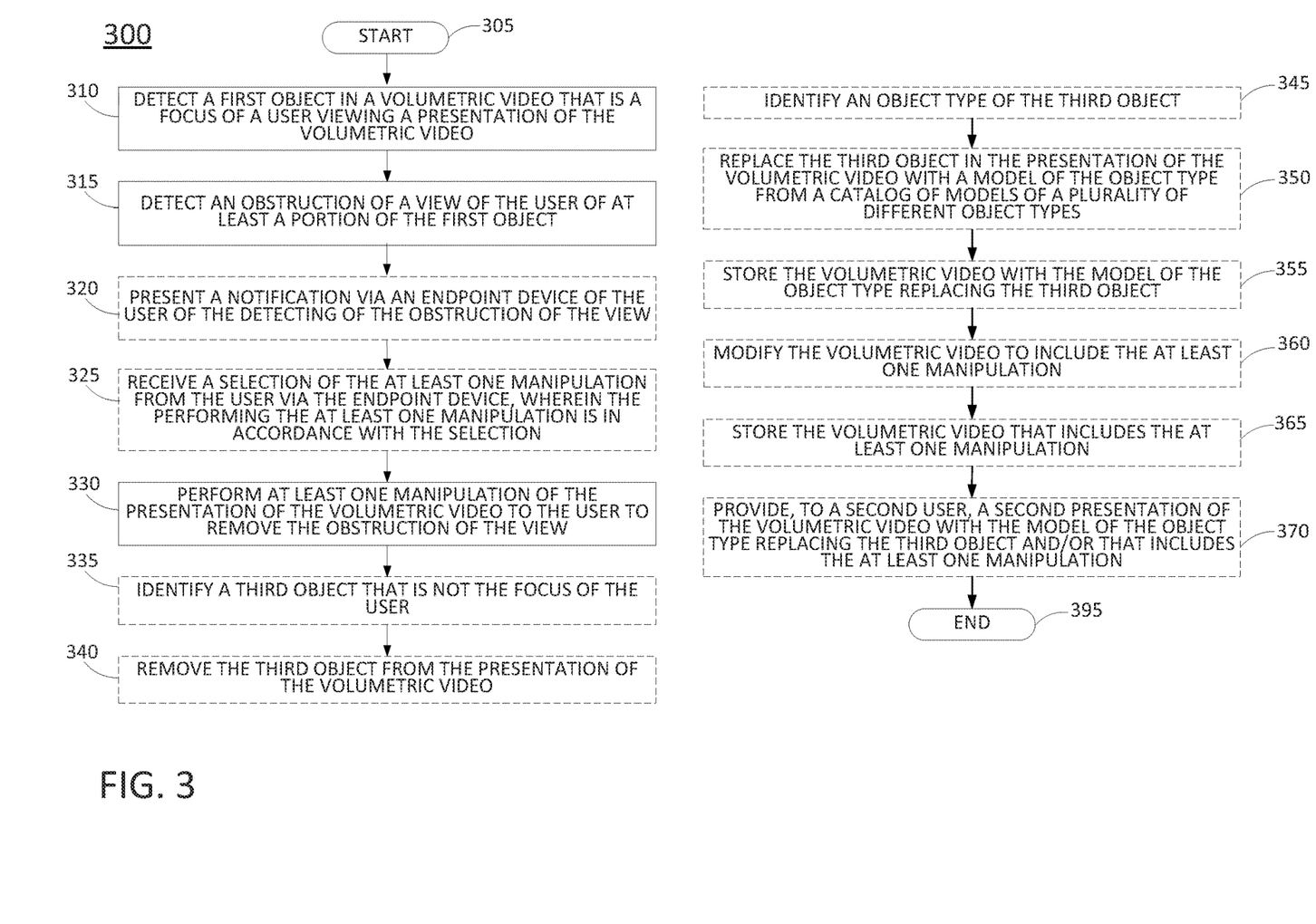
FIG. 3 illustrates a flowchart of an example method for manipulating a presentation of a volumetric video to mitigate an obstruction of a view, in accordance with the present disclosure.

FIG. 3 illustrates a flowchart of an example method 300 for manipulating a presentation of a volumetric video to mitigate an obstruction of a view, in accordance with the present disclosure. In one example, the method 300 is performed by a component of the system 100 of FIG. 1, such as by application server 104, device 132, and/or any one or more components thereof (e.g., a processor, or processors, performing operations stored in and loaded from a memory), or by application server 104, in conjunction with one or more other devices, such as device 132, and so forth. In one example, the steps, functions, or operations of method 300 may be performed by a computing device or system 400, and/or processor 402 as described in connection with FIG. 4 below. For instance, the computing device or system 400 may represent any one or more components of application server 104, device 132, etc. in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system detects a first object in a volumetric video that is a focus of a user viewing a presentation of the volumetric video. For example, the user may be viewing the presentation of the volumetric video via an endpoint device comprising an augmented reality device or a virtual reality device. In addition, the focus of the user may be detected from at least one of: an eye gaze of the user, a head movement of the user, a verbal input of the user, a gesture input of the user, or an input of the user via a tactile interface. In one example, the processing system may comprise a network-based processing system, and the presentation of the volumetric video may comprise a streaming to an endpoint device of the user of the volumetric video, a 3D rendering of the volumetric video in accordance with at least one perspective of the user within a space of the volumetric video, or a 2D rendering of the volumetric video in accordance with at least one perspective of the user within a space of the volumetric video.

At step 315, the processing system detects an obstruction of a view of the user of at least a portion of the first object. In one example, the obstruction of the view may comprise a second object in the volumetric video. In another example, the obstruction of the view may comprise another portion of the first object, e.g., the obstruction of the view is an obstruction of a feature on an occluded side of the first object. In other words, the at least the portion of the first object may comprise a side of the first object that is blocked by another side or portion of the first object that is closest to the viewing perspective of the user.

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At optional step 320, the processing system may present a notification via an endpoint device of the user of the detecting of the obstruction of the view. The notification may comprise an audio notification, e.g., an alarm, a machine-generated natural language notification, a highlighting of the object of focus and/or a second object comprising the obstruction of the view, a text box notification overlaid on the presentation of the volumetric video, and so on.

At optional step 325, the processing system may receive a selection of at least one manipulation of the presentation of the volumetric video from the user via the endpoint device. In one example, a plurality of options may be provided to the user for selection, where the options may be presented from a set of manipulations previously selected by the user in other instances, a set of manipulations that is supported by the endpoint device of the user (e.g., omitting options that are not supported), and so on.

At step 330, the processing system performs at least one manipulation of the presentation of the volumetric video to the user to mitigate, e.g., remove, the obstruction of the view. For example, when the obstruction of the view comprises a second object in the volumetric video, the at least one manipulation may comprise one or both of increasing a transparency of the second object in the presentation of the volumetric video or shifting a position of the second object in the presentation of the volumetric video. In another example, the at least one manipulation may comprise removing the second object from the presentation of the volumetric video. In one example, the at least one manipulation may comprise altering a viewing perspective of the user to the first object. In still another example, the at least one manipulation may comprise shifting a position of the first object in the presentation of the volumetric video. For example, the obstruction of the view may comprise a second object in the volumetric video, or may comprise another portion of the first object. Similarly, when the obstruction of the view is an obstruction of a feature on an occluded side of the first object (e.g., a side that is blocked by a side or portion of the first object that is closest to the viewing perspective of the user), the at least one manipulation may comprise rotating the first object from a recorded position within the volumetric video.

In one example, the at least one manipulation may be in accordance with the user selection that may be received at optional step 325. In another example, the at least one manipulation may be selected in accordance with a preference of the user for at least one type of manipulation. For instance, the preference of the user may be defined by the user or may be learned by the processing system in response to one or more user selections and implemented as a contextual rule.

At optional step 335, the processing system may identify a third object that is not the focus of the user. For example, the third object may be detected in accordance with one or more object detection models (e.g., MLM-based models). For instance, the model(s) may be to detect the presence of an object and/or to distinguish an object from surrounding imagery and identify the object's boundaries (e.g., without identifying the type of object).

At optional step 340, the processing system may remove the third object from the presentation of the volumetric video. For instance, the third object may be a non-essential object since it is not the focus of the user, and may be removed (partially or completely) from the presentation of the volumetric video.

At optional step 345, the processing system may identify an object type of the third object. For example, as an alternative or in addition to detecting an object in accordance with optional step 335, the processing system may also identify the type of the object (e.g., "car," "house," "dog," "cat," etc.). For instance, the object type may be determined in accordance with one or more image detection models (e.g., MLM-based models, such as binary classifiers, multi-class classifiers, etc.) for distinguishing object types.

At optional step 350, the processing system may replace the third object in the presentation of the volumetric video with a model of the object type from a catalog of models of a plurality of different object types. For instance, when a chair is detected in the volumetric video, the processing system may replace actual image data of the chair with a 3D model of chair from a catalog or library. In one example, optional steps 345 and 350 may be performed as an alternative to optional step 340.

At optional step 355, the processing system may store the volumetric video with the model of the object type replacing the third object, e.g., by overwriting an existing volumetric video, or creating a new volumetric video or a new version number of the volumetric video.

At optional step 360, the processing system may modify the volumetric video to include the at least one manipulation of step 330, e.g., where the at least one manipulation is not a change in perspective, but may comprise making a second object transparent, removing a second object, moving a position of the first object, a position of a second object, or both, and so on.

At optional step 365, the processing system may store the volumetric video that includes the at least one manipulation performed at step 330, e.g., where the at least one manipulation is not a change in perspective, but may comprise making a second object transparent, removing a second object, moving a position of the first object, a position of a second object, or both, and so on.

At optional step 370, the processing system may provide, to a second user, a second presentation of the volumetric video with the model of the object type replacing the third object and/or that includes the at least one manipulation of step 330. For instance, the second presentation of the volumetric video may be a streaming to a second endpoint device of the second user of the volumetric video (e.g., the modified volumetric video, a 3D rendering of the volumetric video, or a 2D rendering of the volumetric video). For example, a perspective set at step 330 may be fixed in the second presentation of the volumetric video (e.g., where the at least one manipulation is a change in perspective to mitigate, e.g., partially remove, or completely remove, the obstruction of the view, the second user may be limited in how the second user may explore the space of the volumetric video). To illustrate, an instructor may create a training video for students in accordance with the present method 300, in which case it may be appropriate to limit the students' ability to explore the full space of the volumetric video.

Following step 330, or any of the optional steps 335-370, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-330, steps 310-350, etc. In one example, the method 300 may further include identifying contextual factors, such as themes or topics in the volumetric video, a time of day, day of week, etc., whether other users are simultaneously participating in a presentation of the volumetric video, and so forth. In addition, in such an example, step 330 may also include selecting rules for manipulation in accordance with a context that may be determined based upon such various factors. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for manipulating a presentation of a volumetric video to mitigate an obstruction of a view, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for manipulating a presentation of a volumetric video to mitigate an obstruction of a view (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for manipulating a presentation of a volumetric video to mitigate an obstruction of a view (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    detecting, by a processing system including at least one processor, that a first object in a volumetric video is a focus of a user viewing a presentation of the volumetric video;
    detecting, by the processing system, a predicted obstruction of a view of the user of at least a portion of the first object that is the focus of the user in the volumetric video, wherein the predicted obstruction is detected based upon at least one of: a trajectory of the first object or a second object in the volumetric video, or an inspection of a subsequent portion of the volumetric video that follows a portion of the volumetric video that the user is viewing; and
    performing, by the processing system in response to the detecting the predicted obstruction of the view, at least one manipulation of the presentation of the volumetric video to the user to mitigate the predicted obstruction of the view, wherein a viewing perspective of the user to the first object is unchanged via the at least one manipulation.

2. The method of claim 1, wherein the predicted obstruction of the view comprises the second object in the volumetric video, wherein the at least one manipulation comprises:
    increasing a transparency of the second object in the presentation of the volumetric video; or
    removing the second object from the presentation of the volumetric video.

3. The method of claim 1, wherein the predicted obstruction of the view comprises the second object in the volumetric video, wherein the at least one manipulation comprises:
    shifting a position of the second object in the presentation of the volumetric video.

4. The method of claim 1, wherein the at least one manipulation comprises:
    shifting a position of the first object in the presentation of the volumetric video.

5. The method of claim 1, wherein the at least one manipulation comprises:
    rotating the first object from a recorded position within the volumetric video.

6. The method of claim 5, wherein the predicted obstruction of the view is a predicted obstruction of a feature on an occluded side of the first object.

7. The method of claim 1, wherein the at least one manipulation is in accordance with a preference of the user for at least one type of manipulation.

8. The method of claim 1, further comprising:
presenting a notification via an endpoint device of the user of the detecting of the predicted obstruction of the view; and
receiving a selection of the at least one manipulation from the user via the endpoint device, wherein the performing the at least one manipulation is in accordance with the selection.

9. The method of claim 1, wherein the first object being the focus of the user is detected from at least one of:
an eye gaze of the user;
a head movement of the user;
an verbal input of the user;
a gesture input of the user; or
an input of the user via a tactile interface.

10. The method of claim 1, wherein the user is viewing the presentation of the volumetric video via an endpoint device comprising:
an augmented reality device; or
a virtual reality device.

11. The method of claim 1, further comprising:
identifying a third object that is not the focus of the user.

12. The method of claim 11, further comprising:
removing the third object from the presentation of the volumetric video.

13. The method of claim 11, further comprising:
identifying an object type of the third object; and
replacing the third object in the presentation of the volumetric video with a model of the object type from a catalog of models of a plurality of different object types.

14. The method of claim 13, wherein the processing system comprises a network-based processing system, and wherein the presentation of the volumetric video comprises a streaming to an endpoint device of the user of:
the volumetric video;
a three-dimensional rendering of the volumetric video in accordance with at least one perspective of the user within a space of the volumetric video; or
a two-dimensional rendering of the volumetric video in accordance with the at least one perspective of the user within the space of the volumetric video.

15. The method of claim 13, further comprising:
storing the volumetric video with the model of the object type replacing the third object; and
providing, to a second user, a second presentation of the volumetric video with the model of the object type replacing the third object.

16. The method of claim 1, further comprising:
modifying the volumetric video to include the at least one manipulation; and
storing the volumetric video that includes the at least one manipulation.

17. The method of claim 16, further comprising:
providing, to a second user, a second presentation of the volumetric video that includes the at least one manipulation.

18. A non-transitory computer-readable medium storing instructions which, when executed by a processing system including at least one processor, cause the processing system to perform operations, the operations comprising:
detecting that a first object in a volumetric video is a focus of a user viewing a presentation of the volumetric video;
detecting a predicted obstruction of a view of the user of at least a portion of the first object that is the focus of the user in the volumetric video, wherein the predicted obstruction is detected based upon at least one of: a trajectory of the first object or a second object in the volumetric video, or an inspection of a subsequent portion of the volumetric video that follows a portion of the volumetric video that the user is viewing; and
performing, in response to the detecting the predicted obstruction of the view, at least one manipulation of the presentation of the volumetric video to the user to mitigate the predicted obstruction of the view, wherein a viewing perspective of the user to the first object is unchanged via the at least one manipulation.

19. A device comprising:
a processing system including at least one processor; and
a computer-readable medium storing instructions which, when executed by the processing system, cause the processing system to perform operations, the operations comprising:
detecting that a first object in a volumetric video is a focus of a user viewing a presentation of the volumetric video;
detecting a predicted obstruction of a view of the user of at least a portion of the first object that is the focus of the user in the volumetric video, wherein the predicted obstruction is detected based upon at least one of: a trajectory of the first object or a second object in the volumetric video, or an inspection of a subsequent portion of the volumetric video that follows a portion of the volumetric video that the user is viewing; and
performing, in response to the detecting the predicted obstruction of the view, at least one manipulation of the presentation of the volumetric video to the user to mitigate the predicted obstruction of the view, wherein a viewing perspective of the user to the first object is unchanged via the at least one manipulation.

20. The device of claim 19, wherein the user is viewing the presentation of the volumetric video via an endpoint device comprising:
an augmented reality device; or
a virtual reality device.

* * * * *